United States Patent [19]

Bardet

[11] 4,100,386

[45] Jul. 11, 1978

[54] PROCESS FOR SINTERING CERAMIC PRODUCTS

[75] Inventor: Gérard Bardet, Paris, France

[73] Assignees: Automatisme & Technique, Arcueil; Desmarquest Et C.E.C., Montrouge, both of France

[21] Appl. No.: 716,552

[22] Filed: Aug. 23, 1976

[51] Int. Cl.² .............................................. H05B 9/06
[52] U.S. Cl. .................... 219/10.55 M; 219/10.55 A; 219/10.55 E; 264/25
[58] Field of Search ................. 219/10.55 E, 10.55 F, 219/10.55 R, 10.55 A, 10.61; 264/25, 30, 56; 106/39.5

[56] References Cited

U.S. PATENT DOCUMENTS

| | | | |
|---|---|---|---|
| 2,608,637 | 8/1952 | Dakin et al. | 219/10.55 R |
| 3,031,555 | 4/1962 | Ross et al. | 219/10.61 |
| 3,474,209 | 10/1969 | Parker | 219/10.55 F |
| 3,585,258 | 6/1971 | Levinson | 219/10.55 E |

*Primary Examiner*—Bruce A. Reynolds
*Assistant Examiner*—Bernard Roskoski
*Attorney, Agent, or Firm*—Brown, Murray, Flick & Peckham

[57] ABSTRACT

A ceramic or refractory product is placed in a sounding cavity close to but spaced from an opposing member and they are heated to a predetermined temperature to sinter or melt said product by subjecting them to the action of a hyperfrequential electromagnetic field. The opposing member is formed from a material having dielectric losses higher than those of said product in the temperature range below said predetermined temperature so that the intensity of the field will be increased locally in the immediate vicinity of the surface area of said product opposed to said member and that area will be exposed to thermic radiation from the opposing member and be protected by that member from thermic losses.

5 Claims, 3 Drawing Figures

U.S. Patent   July 11, 1978   4,100,386
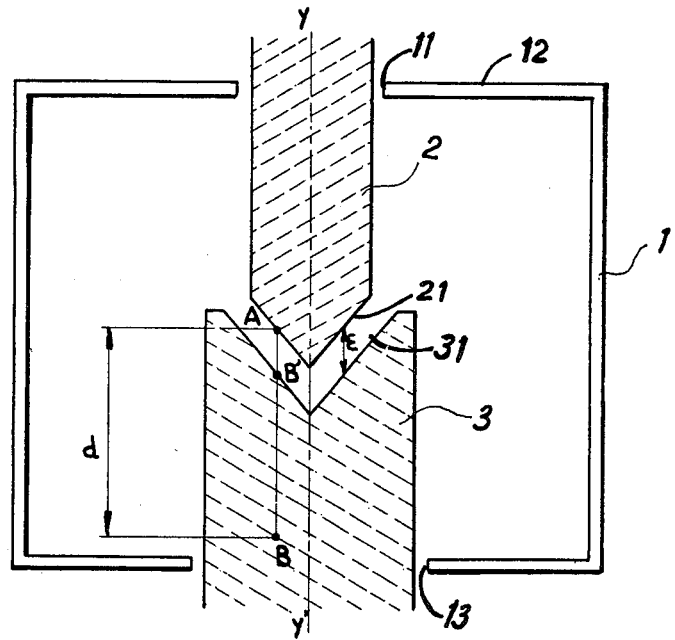
FIG. 1
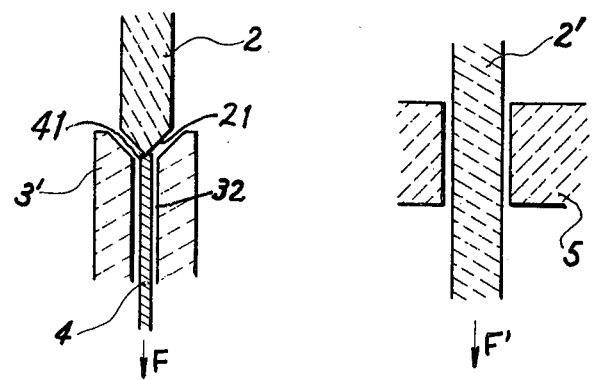
FIG. 2
FIG. 3

PROCESS FOR SINTERING CERAMIC PRODUCTS

The invention relates to a process for sintering ceramic products, preferably ceramic products of a small size, likely to be sintered at high temperature and possibly carrying additional parts.

Difficulties are sometimes met, in particular when it is required to bring products whose dielectric losses are especially low, to their sintering or melting temperature. This for example the case for the very pure silica whose losses below 1900° C are extremely low.

The purpose of the present invention is to remedy these difficulties and to create a process making it possible to perform the microwave heating of products whose dielectric losses are extremely low at temperatures lower than the sintering or melting ones.

To this end, the invention provides a process whereby the hyperfrequential electromagnetic field is locally increased in the immediate vicinity of a portion of the surface of the product to be sintered or melted, while said portion of the surface of the product to be sintered or melted is protected against losses through radiation and, on the contrary, exposed to the radiation of a heated body.

The invention will be explained with more details with the aid of an example of application thereof referring to the melting of a bar of a very pure silica, and by means of the drawings attached hereto, wherein:

FIG. 1 shows a first example of application of the process according to the invention.

FIG. 2 is a variant of the application of the process according to the invention.

FIG. 3 shows a further variant of application of the process according to the invention.

In FIG. 1, the reference 1 designates a sounding cavity, that is to say, a wave-guide closed at each end by plates conducting electricity, said plates being in electric contact with the other walls of the wave-guide.

Through a window 11, arranged in the plate of the upper end 12, there has been introduced into the cavity 1 a bar 2 of very pure silica, whose lower end 21 carries a cone-shaped point. Through a window 13 in the plate of the lower end, another bar 3 whose upper end 31 carries a cone-shpaed depression, has been introduced. Said bar 3 consists of a material whose dielectric losses are relatively great for temperatures lower than the melting temperature of the pure silica the bar 2 is made of.

Let us suppose that to start with the cavity 1 is empty. Through means already known and, therefore, not shown in the drawing, a hyperfrequency electromagnetic field is generated inside said cavity. The cavity has been design, for example, so that the electric compenent of the hyperfrequential electromagnetic field will be constant along the axis YY' of said cavity. Now, should two points A and B located in the vicinity of the axis YY' be considered, point A being located about halfway between the plates of the upper and lower ends, and point B in the vicinity of the lower plate, there is a $V_{AB}$ difference in potential between both points. If $d$ is the distance between the two points A and B, the intensity of the electric component of the hyperfrequential electromagnetic field will be proportional to the ratio $V_{ab}/d$.

Now, let us suppose that now the bar 2 of very pure silica ($SiO_2$) is introduced through the upper window 11, and that it is driven into the cavity 1 till the cone-shaped surface 21 of its end is located in the vicinity of point A. The introduction of the bar 2, in view of the very high dielectric rigidity thereof, does not substantially modify the former situation and the hyperfrequential electromagnetic field at point A is still proportional to the ratio $V_{AB}/d$.

Now, let us suppose that the bar 3 is introduced through the lower window 13 and brought to a distance $\epsilon$, measured in a parallel direction to the axis YY', from the bar 2. The bar 3 will, for example, consist of a material such as alumina ($Al_2O_3$) possibly carrying additional parts so as to increase dielectric losses thereof at temperatures ranging far over the melting temperature of the silica. When the bar 3 is introduced into the cavity, the temperature in the whole thereof is the same as that of the laboratory, that is to say, close to 20° C. At such a temperature, the bar 3 shows an important dielectric rigidity, so that the fact of its introduction does not immediately modify the preceding situation, and the intensity of the hyperfrequential electromagnetic field remains unchanged at point A. However, under the action of the hyperfrequential electromagnetic field, the bar 3 is more quickly heated than the bar 2 whose dielectric losses are very small at a low temperature and increase very slowly with the temperature. After a while, the bar 3, and in particular its end 31 adjacent the bar 2, will reach a high temperature of about 2000° C, for example.

Not only does the rise in temperature of the bar 3 considerably increase the dielectric losses of the constituent material of said bar 3, but also considerably increases the electric conductibility of said material, while it was negligible at a low temperature. Due to the increase in conductibility, the potential of point B', located on the end surface of the bar 3, becomes very close to that of point B. It results therefrom that the intensity of the hyperfrequential electromagnetic field at point A, which was proportional to the ratio $^VAB/d$, becomes proportional to the ratio $^VAB/\epsilon$. Due to the very small value of $\epsilon$ in relation to d, this results in a most important increase in the intensity of the hyperfrequential electromagnetic field at point A.

Simultaneously with said considerable increase in the intensity of the hyperfrequential electromagnetic field at point A, the heating of the bar 3 results in a further consequence, namely: the heating of the end 21 through the direct thermic radiation generated by the end 31 of the bar 3, because said end 21 of the bar 2 is located very near to the end 31.

Heating the end of the bar 2 through thermic radiation increases, in the vicinity of said end, the dielectric losses of the very pure silica the bar 2 is made of, and this effect combined with the increase in the hyperfrequential electromagnetic field causes the end of the bar 2 to heat up more and more rapidly since the dielectric losses continue to increase with the temperature. During said heating, the cone-shaped end 21 of the bar 2 is protected against thermic losses through radiation by the hot end 31 of the bar 3 which surrounds it.

The end 21 of the bar 2 getting heat more and more quickly will reach the melting temperature of the very pure silica and, at that time, the bar 3 can be withdrawn from the cavity. Despite the decrease in the intensity of the hyperfrequential electromagnetic field caused by said withdrawal, the very pure silica constituting the bar 2 will remain in the same state, because the increase in the dielectric losses of the pure silica balances the decrease in the hyperfrequential electromagnetic field. From the end thus melted of the bar 2, a drop of melted silica will break off entailing a thread of silica with it, not shown. This thread of silica can be wound up on a drum, while a mechanism will progressively move forward the bar 2 along the axis YY' and, thus, almost the totality of the bar 2 will be turned into a thread of silica, the diameter of which depending in particular on the circumferential speed of the winding-drum of the thread and the forward speed of the bar 2 along the axis YY'.

FIG. 2 shows a variant of the application of the process described hereabove. The difference rests in that the bar 3' is provided with an axial bore 32. Said bore 32 does not substantially modify the action of the bar 3' in regard to the increase in the hyperfrequential electromagnetic field at the end 21 of the bar 2, nor in regard to the heating of said end 21 through thermic radiation. On the other hand, said bore 32 makes it possible, when the melting of the end 21 of the bar 2 is reached, to introduce a rod 4 consisting of a suitable material, for example, very pure silica too. The end 41 of the rod 4, put into contact with the melting end of the bar 2, is rather quickly welded with said end, and by withdrawing the rod 4 in the direction of arrow F, a thread of silica is thus entailed and afterwards wound up such as previously described. The arrangement shown in FIG. 2 makes it possible to maintain the bar 3 in position, the presence of which does not interfere with performing the drawing operation.

FIG. 3 shows a further variant for working out the process provided by the invention. As shown in said FIG. 3, the bar 2' is surrounded with a ring 5 consisting of a material having the same characteristics as the material the bar 3 was made of. The extensions of said ring 5, not shown in FIG. 3, and which serve as a support to said ring, are distributed in such a way that they can be kept outside the cavity as, in the case of FIGS. 1 and 2, the lower end of the bar 3 was. The conditions in connection with the hyperfrequential electromagnetic field and the thermic radiation which have been explained about FIGS. 1 and 2, are quite the same in case of FIG. 3, for the whole surface of the bar 2', close to the internal wall of the ring 5. This enables one to reach an important and increasing heating of this portion of the surface of the bar 2', and to thus reach the melting temperature of the very pure silica. Should then a traction be exerted in the direction of arrow F' onto the lower end of the bar 2', stretching of a thread of silica is thus obtained, which can be wound up on a drum as stated above, without having to remove the ring 5.

Thus, the improvements provided by the present invention make it possible, through the combination of the local increase of the intensity of the hyperfrequential electromagnetic field, a bar and the protection against losses through thermic radiation the heating of a bar through thermic radiation generated very close to it, and make it possible to bring materials to very high temperatures through the sole action of a hyperfrequential electromagnic field, i.e. materials such as very pure silica whose dielectric losses at a normal temperature are unimportant and increase very slowly with the temperature.

In the examples of application of the process provided by the invention which have just been described, it has been assumed that the material processed was very pure silica. Of course, the invention applies to all materials whose dielectric losses, very small at a normal temperature, increase in relation to the temperature. The nature of opposed materials, that is to say the nature for instance of the material the bar 3 is made of in the previous examples, will be selected in view of the nature of the material to be processed. As it has been made clear, said opposed materials must show, within the range of temperatures located below the processing temperature sought, dielectric losses much greater than those of the material to be processed. Furthermore, said opposed materials must remain rather solid and cohesive in the vicinity of the maximal temperature reached when processing is performed.

Also, the shape of the material to be processed and that of the opposed material are not restricted to those referred to in the three examples described hereabove. Other shapes can be conceived provided the conditions required to locally increase the intensity in the hyperfrequential electromagnetic field, to generate heating through thermic radiation and to prevent thermic losses, are fully realized.

Of course, the invention is not limited to the modes of embodiment described and depicted hereabove, from which other modes and methods of embodiment can be provided without thereby departing from the scope of the invention.

What we claim is:

1. A process for sintering or melting ceramic or refractory products in a sounding cavity, comprising placing in a sounding cavity on opposing member in a sounding cavity on opposing member close to but spaced from a ceramic or refractory product in said cavity an opposing member, and subjecting said product and member to the action of a hyperfrequential electromagnetic field to heat them to a predetermined temperature, said opposing member formed from a material having dielectric losses higher than those of said product in the temperature range below said predetermined temperature, whereby the intensity of the hyperfrequential electromagnetic field will be increased locally in the immediate vicinity of the surface area of said product opposed to said member, and said area will be exposed to thermic radiation from said member and be protected by that member from thermic losses.

2. A process for sintering or melting ceramic or refractory products in a sounding cavity according to claim 1, wherein said opposing member is ring-shaped and surrounds said product.

3. A process according to claim 1, wherein said product is a bar with a cone-shaped end, and said opposing member is a bar provided with a cone-shaped depression in one end, the process including the steps of axially aligning said bars, and inserting the cone-shaped end of said product bar in said cone-shaped depression in closely spaced relation with said opposing member bar.

4. A process according to claim 3, wherein said opposing member bar is provided with an axial bore therethrough.

5. A process according to claim 3, wherein said opposing member bar is provided with an axial bore therethrough, and a rod is inserted in said bore and into engagement with said product bar.

* * * * *